(No Model.)
S. T. DUTTON.
RAILWAY SIGNAL.
No. 431,652. Patented July 8, 1890.
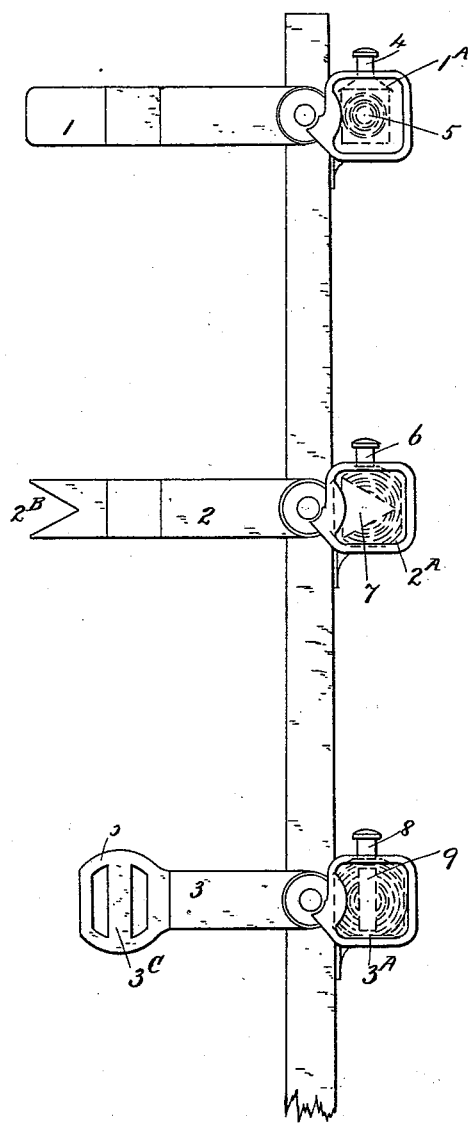
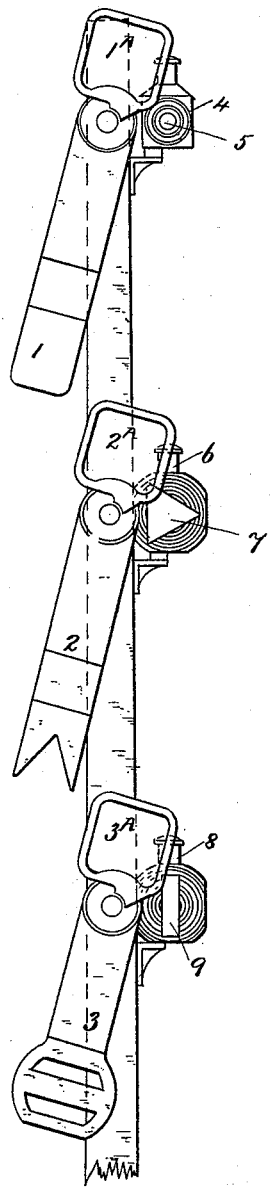
WITNESSES
Walter Allen
N. L. Collamer
INVENTOR
S. T. Dutton
by Herbert W. T. Jenner.
Attorney

UNITED STATES PATENT OFFICE.

SAMUEL TELFORD DUTTON, OF WORCESTER, COUNTY OF WORCESTER, ENGLAND.

RAILWAY-SIGNAL.

SPECIFICATION forming part of Letters Patent No. 431,652, dated July 8, 1890.

Application filed July 1, 1889. Serial No. 316,268. (No model.) Patented in England March 21, 1885, No. 3,673; in France December 23, 1885, No. 173,094, and in Belgium December 29, 1885, No. 71,415.

*To all whom it may concern:*

Be it known that I, SAMUEL TELFORD DUTTON, a subject of the Queen of Great Britain and Ireland, residing at the city of Worcester, county of Worcester, England, have invented useful Improvements in Railway - Signal Lamps and Appliances Connected Therewith, (for which I have obtained patents in Great Britain, No. 3,673, bearing date of March 21, 1885; in France, dated December 23, 1885, No. 173,094, and in Belgium, dated December 29, 1885, No, 71,415,) of which the following is a specification.

My invention has reference generally to improvements in railway-signal lamps and their lenses and to apparatus connected therewith. I propose to as nearly as possible construct and arrange (and work, if desirable) the parts of distant-signal and shunting-signal lamps that at night the said lamps shall present an appearance different from that presented by the home and starting signal lamps, the said lamps being made, in the case of the distant signal, preferably to show a luminous figure or image resembling the end of the signal-arm. In the case of shunting-signals, the end of the arm would be shaped to present a broad stroke across a circle, and in the corresponding night signal the lamp would be made to show a luminous representation of the end of the said arm. The attention of drivers is thus called more vividly to the distant and shunting signals than when the lamps of the said signals resemble the lamps of the home and starting signals. It is optional whether I cut away a sector from the lens about the same angle as the end of the distant arm and cut away a broad stroke vertically across the lens in the case of the shunt-signal, or whether in both cases the sector and vertical stroke described may be blackened or made opaque. In cases where a lens is not used the front glasses of the lamps may be roughened or made semi-transparent and have a black or opaque sector or stroke upon it. The semi-transparent glass may be used in conjunction with a lens. Where the movable glasses called "double spectacles" are used, the sector and broad stroke may be painted or otherwise made on the glasses of the spectacles, so that when the said glasses are moved by the signal in front of the lamp they shall produce the required form of light in its two positions.

I will now proceed to describe, with reference to the accompanying drawings, the manner in which this portion of my invention is to be performed.

Figures 1 and 2 represent front elevations of a semaphore-arm, (other than a distant-signal arm,) a distant-signal arm, and a shunt-signal arm constructed according to my invention.

In Fig. 1 the various arms are at the danger or normal position, and in Fig. 2 the various arms are represented in the worked or safe position.

The same figures represent the same parts in these illustrations.

1 is an arm (other than a distant-arm.)

2 is a distant-signal arm, and 3 is a shunt-signal arm.

$1^a$ is the spectacle or night signal of the semaphore-arm.

$2^b$ is the fish-tail at the end of the said arm 2, denoting that it is a distant signal.

$2^a$ is the spectacle or night signal of the distant-arm.

6 is the distant-signal lamp.

7 is the sector or fish-tail across the lens, corresponding at night to the fish-tail at the end of the arm during the day.

$3^a$ is the spectacle or night signal of the shunt-arm 3.

$3^c$ is the distinguishing end of the shunt-arm 3.

8 is the shunt-signal lamp, and 9 is the broad stroke across the lens, corresponding to the stroke or bar $3^c$ at the end of shunt-arm.

It is obvious and requires no explanation to those skilled in the art that the danger or normal position, as in Fig. 1, is the important position of a railway-signal, whether arm or light. Danger is represented at night by a red light, and applies to all signals. In all signals except the distant signal, if a red light is exhibited at night or the arm is at an angle of ninety degrees with the post at day drivers know that they must stop their train at the signals. Drivers, however, are authorized to pass the distant signal at danger. It is therefore highly essential that some distinction should be made at night corresponding to the distinction made by day between a distant and any other signal. With my invention I make this distinction by exhibiting a corresponding fish-tail on the lamp to the fish-tail on the arm. I carry the distinctions to a system, so that at night drivers may clearly see what is the nature of the signal, whether distant, any other block-signal, or a shunt-signal.

What I claim is—

1. The combination, with a day signal, provided with a clearly-displayed figure adapted to distinguish it from other similar signals, of a night signal adapted to be used in conjunction with the said day signal, and consisting of a lamp provided with a figure corresponding in shape with the said figure displayed by the day signal and adapted to cut off a portion of the light-rays proceeding from said lamp, whereby said figure is displayed upon a luminous background, substantially as and for the purpose set forth.

2. The combination, with a day signal, provided with a clearly-displayed figure adapted to distinguish it from other similar signals and a spectacle eye adapted to be brought in front of the night-signal lamp when the said day signal is placed to indicate danger, of a night signal adapted to be used in conjunction with the said day signal, and consisting of a lamp provided with a figure corresponding in shape with the said figure displayed by the day signal and adapted to cut off a portion of the light-rays proceeding from said lamp, whereby said figure is displayed upon a luminous background, substantially as and for the purpose set forth.

SAMUEL TELFORD DUTTON.

Witnesses:
    FREDERICK ARTHUR ATKINSON,
        *Worcester.*
    ERNEST WHITE.